United States Patent [19]
van der Lely

[11] Patent Number: 5,762,020
[45] Date of Patent: Jun. 9, 1998

[54] IMPLEMENT FOR MILKING ANIMALS

[76] Inventor: Cornelis van der Lely, 7 Brüschenrain, CH-6300 Zug, Switzerland

[21] Appl. No.: 681,526

[22] Filed: Jul. 23, 1996

Related U.S. Application Data

[63] Continuation of PCT/NL95/00405, Nov. 28, 1995.

[30] Foreign Application Priority Data

Nov. 30, 1994 [NL] Netherlands ............................ 9402010

[51] Int. Cl.⁶ ................................ A01J 5/007; A01J 7/02
[52] U.S. Cl. ...................... 119/14.08; 119/14.1; 119/14.18
[58] Field of Search ............................. 119/14.08, 14.1, 119/14.14, 14.18

[56] References Cited

U.S. PATENT DOCUMENTS

| | | | |
|---|---|---|---|
| 2,873,723 | 2/1959 | Duncan et al. | 119/14.18 |
| 3,695,230 | 10/1972 | Quayle et al. | 119/14.14 |
| 5,080,040 | 1/1992 | van der Lely et al. | 119/14.09 |
| 5,474,023 | 12/1995 | Khondabandehloo et al. | 119/14.1 |

FOREIGN PATENT DOCUMENTS

| | | |
|---|---|---|
| 963128 | 2/1975 | Canada ............................ 119/14.08 |
| 0 476 771 A1 | 3/1992 | European Pat. Off. . |
| 0 510 779 A2 | 10/1992 | European Pat. Off. . |
| 0 592 043 A1 | 4/1994 | European Pat. Off. . |

OTHER PUBLICATIONS

International Search Report (PCT) for Netherlands Application No. 9402010, filed Nov. 30, 1994.

*Primary Examiner*—Robert P. Swiatek
*Assistant Examiner*—Elizabeth Shaw
*Attorney, Agent, or Firm*—Penrose Lucas Albright

[57] ABSTRACT

An apparatus for milking animals, such as cows, which includes a milking robot for automatically connecting and disconnecting teat cups to and from the teats of an animal, and a milking machine for automatically milking the animal. Sensors for detecting contamination of the milk are installed in each discharge line from a teat cup, in the claw or a jar which receives the individual lines from the teat cups, in the discharge from the claw or jar, and in a milk conduit connected to a three-way valve which selectively conveys milk to a bulk milk tank or to a rinsing fluid reservoir. The latter is in a recirculation system for cleaning the teat cups, the claw or jar which receives the discharge lines from the teat cups, and the discharge line from the claw or jar, there being a recirculation pump in such discharge line. The sensors send data to a computer as to the degree of contamination which they individually sense at their various locations. When a pre-programmed maximum degree of contamination is sensed by one of the sensors, the computer controls the valving and recirculation pump to initiate cleansing and rinsing of the milking system.

17 Claims, 1 Drawing Sheet

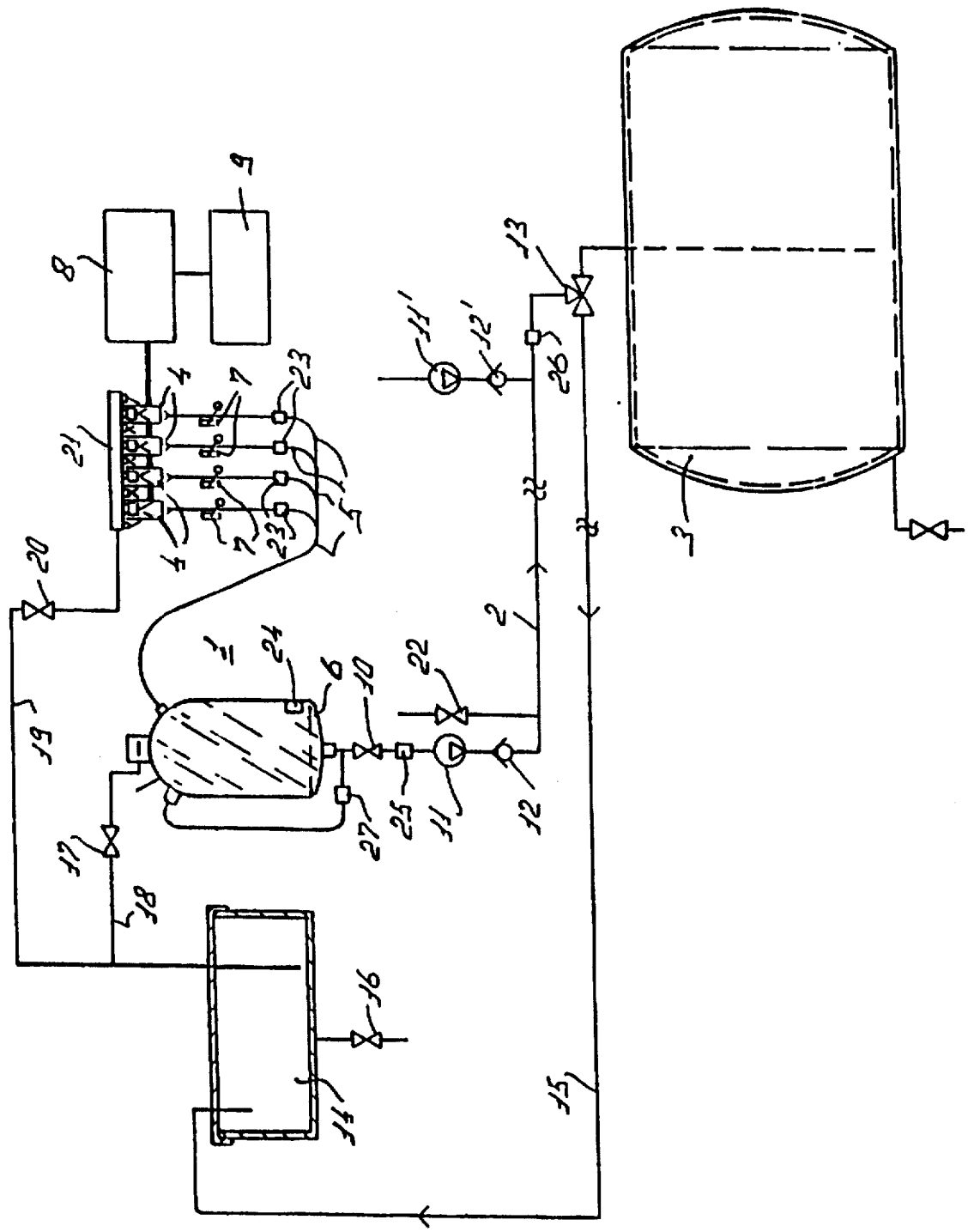

IMPLEMENT FOR MILKING ANIMALS

RELATED APPLICATION

This is a Continuation Application of PCT Application PCT/NL95/00405, filed Nov. 28, 1995.

FIELD OF INVENTION

The present invention relates to an apparatus for milking animals, such as cows, comprising at least one milking robot for automatically connecting teat cups to the teats of an animal, and at least one milking machine for automatically milking the animals. In particular, the invention pertains to an automatic milking system which is automatically cleansed after a predetermined period of time or earlier, if the system is contaminated.

BACKGROUND OF THE INVENTION

An automatic milking apparatus often has a disadvantage in that, when during milking one of the cups is disengaged from a teat, for example, because it is kicked off by the animal, contamination may enter the milking system of the milking machine, via the openings for receiving the animals' teats in the teat cups. Milking systems to which the invention applies have milking parts that come into contact with milk. In addition, in such a milking system, its milking machine will include a vacuum system as well as cleaning means for the milking system, often in the form of a rinsing fluid line system which also incorporates at least part of the milking system. Another source of contamination of the milking system occurs when there is a considerable lapse of time between milkings. During these intervals, residues of milk may collect on the walls of the milk lines or elsewhere in the system. Yet another source of contamination of the milking systems occurs when the teat cups are connected to teats that have been insufficiently cleaned. Although these problems can be largely prevented by frequent cleaning of the milking system, this is not an optimal solution in view of the fact that, when many animals are to be milked in succession, the milking process must be interrupted relatively often with the cleansing operations and relatively large quantities of cleaning fluid are used.

SUMMARY OF THE INVENTION

According to the invention, an advantageous solution to this problem is provided when the apparatus includes a plurality of sensors for the detection of contamination in the milking system. Contamination ascertained by the sensors is recorded in a computer. On the basis of the information supplied by the sensors, the degree of contamination can be defined by means of a computer. The cleaning of the milking system can then be effected on the basis of that degree of contamination. In other words, the milking system is only cleaned when sensors ascertain that a certain degree of contamination has occurred. Therefore, the invention also relates to an apparatus for milking animals, such as cows, comprising a milking robot for automatically connecting teat cups to the teats of an animal, respectively, disconnecting same therefrom, a milling machine for automatically milking the animals and cleaning means for cleansing the milking system including the milking machine, which is characterized in that the cleansing of the milking system is effected on the basis of the degree of contamination.

To ascertain the extent to which the system has been contaminated and to establish the degree in which the contamination is to be attributed to the individual animals, according to the invention, the apparatus is furthermore characterized in that the degree of contamination of the milking system is defined after the individual animals have been milked.

According to an other aspect of the invention, the cleaning of the milking systems is effected when after an animal has been milked, a fixed period of time has elapsed without a next animal having presented itself to be milked, unless the degree of contamination is such that the milking system has to be cleaned immediately after an animal has been milked. In other words, when on the basis of the degree of contamination ascertained, cleaning of the milking system is considered to be desirable, this cleaning will preferably be affected in those periods of time during which the milking apparatus is used less intensively. However, when the degree of contamination is such that the milking system has to be cleaned immediately, the cleaning operation will not be delayed until the prescribed period of time before the cleaning operation would normally be commencing has ended. Therefore, the invention furthermore relates to an apparatus for milking animals, such as cows, comprising a milking robot for automatically connecting test cups to the teats of an animal, respectively disconnecting same therefrom, and a milking machine for automatically milking the animals, which apparatus is characterized in that the cleaning of the milking system is effected when, after an animal has been milked, a fixed period of time has elapsed without a next animal having presented itself to be milked, unless the degree of contamination is such that the milking system has to be cleaned immediately after an animal has been milked. Even though hardly any contamination of the milking system occurs, it may still be desirable to clean the milking system after a certain duration of time in any event. Therefore, according to a further aspect of the invention, it is possible, after a fixed period of time has elapsed since the previous cleaning of the milking system, to clean the milking system again, even though the degree of contamination for which cleaning would otherwise be initiated has not yet been reached.

The sensor or sensors for the detection of contamination in the milking system are adapted to be provided in one or more teat cups and/or in a milk meter, such as a milk glass, and/or in one or more parts of the line leading from the teat cups to a milk tank, for example, near a milk pump incorporated in the line between the milk meter and the milk tank. The sensors to be used for the detection of contamination in the milking systems are adapted to be incorporated in a radioscopic or an ultrasonographic sensor measuring system. On the other hand, it is also possible to detect contamination in the milking systems by means of a combination of a filter and pressure means incorporated in a milk line for defining the pressure ratio over this filter, an accumulation of dirt in the filter being capable of changing the pressure ratio across the filter in the milk line.

BRIEF DESCRIPTION OF THE DRAWING

For a better understanding of the invention and to show how the same may be carried into effect, reference will now be made, by way of example, to the accompanying drawing, in which the milking apparatus is shown as schematically.

DESCRIPTION OF THE PREFERRED EMBODIMENT

A milking machine or apparatus designated generally by reference numeral 1 is connected to a supply line 2 leading to a milk tank 3. Milking machine 1 comprises four teat cups 4 that are to be connected to the teats of an animal to be milked. From teat cups 4, four milk lines 5 connect to a milk meter 6 constituted by a milk glass. Each milk line 5 is provided with a valve 7 to close it off or otherwise to secure it as soon as the degree of vacuum in a corresponding teat cup is disrupted. Teat cups 4 are capable of being connected to the teats of an animal and disconnected therefrom by means of a robot 8 which, in this case, is provided with a robot arm that serves as a carrier for teat cups 4, milking robot 8 being controlled from a computer 9. The quantity of milk obtained during each milking run is measured in milk meter 6. For that purpose, a sensor 27 defines the difference between pressure in the upper part of milk glass 6 and the pressure of the milk in the milk glass, the pressure differential being transmitted to computer 9. The milk in milk glass 6 is supplied therefrom to supply line 2. To do so, the discharge opening of milk glass 6 is connected via cock 10 to a pump 11. By means of pump 11, milk is pumped via a non-return valve 12 into supply line 2, to which, of course, further like milking apparatuses may be connected; the drawing shows another pump 11' and another non-return valve 12', via which units there can be supplied milk from the milk glass of a second milking apparatus to supply line 2. Apart from milking robot 8 in the separate milking apparatuses, the latter constitute, together with milk tank 3, the milking system.

At the end of supply line 2, near milk tank 3, a three-way cock 13 is provided, to which a rinsing fluid discharge line 15 is connected to the sewer via a cock 16. When cock 13 is in a first position, milk from milking machine 1 is routed to milk tank 3, while, when the cock 13 is in a second position, fluid is routed into a rinsing fluid recirculation system. This system comprises rinsing fluid reservoir 14, a line 18 which is provided with a cock 17 and extending from there to milk glass 6, milk glass 6 itself, cock 10 connected to the discharge opening of milk glass 6, pump 11, non-return valve 12, supply line 2, three-way cock 13 and rinsing fluid discharge line 15. With the aid of pump 11, rinsing fluid can be drawn from rinsing fluid reservoir 14 and pumped through the said recirculation system. In this manner, part of the milking apparatus, the milk glass 6 and the units connected thereto, as well as the supply line 2, are cleaned. However, for the purpose of cleaning teat cups 4 as well, there is provided a by-pass comprising a line 19 which extends from rinsing fluid reservoir 14, via a cock 20 to a cassette 21 provided with nozzles for cleaning the insides of teat cups 4, which, after milking, are connected to a cassette 21. From teat cups 4, rinsing fluid flows through milk lines 5 to milk glass 6. The rinsing fluid drawn by pump 11 is not only routed via the cock 17 immediately through milk glass 6, but also via cock 20, to cassette 21, teat cups 4 and milk lines 5 to milk glass 6. Consequently, by means of pump 11, it is possible to clean each milking apparatus of the milking system separately, together with supply line 2. In supply line 2, near where milking apparatus 1 is situated farthest from the milk tank 3, an air-supply valve 22 is provided. By means of this valve 22, it is possible to blow air through almost the entire supply line 2 to make it milk-free after milking and to remove rinsing fluid after cleaning. Furthermore, milk tank 3 can be cleaned independently of milking apparatus 1 and supply line 2. The cleaning system for milk tank 2 is not shown in the drawing, several different types of cleaning apparatus which serve this purpose being well know.

The decision as to when the milking system, i.e. those parts of the milking apparatus that comes into contact with the milk, should be cleaned can be made on the basis of duration of time; the computer decides after a fixed number of hours has elapsed, whether or not the milking process is to be interrupted and the milking system cleaned. This command can also be given each time when the milk tank is emptied or will be emptied, because the milking system is then, for the most part, out of use. The milking system can also be cleaned each time after a predetermined number of animals has been milked. However, a better procedure is to cause the cleaning to occur when a certain degree of contamination has been reached. For this purpose, the milking system comprises sensors. The embodiment shown in the drawing is provided with sensors 23 in milk lines 5 between the separate test cups 4 and milk glass 6, with a sensor 24 in the milk glass 6 itself, a sensor 25 in the line between milk glass 6 and pump 11, and a sensor 26 in line 2 between pump 11 and milk tank 3, near the cock 13. However, said sensors can also be incorporated in teat cups themselves or at other places in milk lines 5 and 2 different than those indicated in the drawing. The sensors 23, 24, 25 and 26 are connected to computer 9, so that by means of this computer it is recorded when a sensor has ascertained a contamination in the milking system. On the basis of the information supplied by sensors 23, 24, 25 and 26, computer 9 can define degrees of contamination, so that it determines whether or not the milking system is to be cleaned. The application of the above-mentioned sensors also enables ascertainment of the degree of contamination of the milking systems after the separate animals have been milked. When the teats of an animal, prior to being milked, are cleaned insufficiently, a marked increase in the degree of contamination may be recorded in computer 9. Therefore, by a continuous recording of the degree of contamination of the milking system information is acquired on how well the cleaning means clean the teats of the animal or the degree of contamination of the animal's teats themselves or both. The degree of contamination, on the basis of which it is decided to proceed to the cleaning of the milking system, can be combined with other criteria, such as a fixed period of time that has elapsed. For example, in addition to using the criterion of the degree of contamination, the milking system may be cleaned in any event when a fixed period of time has elapsed since the previous cleaning even though the degree of contamination is insufficient to initiate the process. It is possible to incorporate sensors 23, 24, 25 and 26 in a radioscopic or an ultrasonographic sensor measuring system which is especially adapted to determine the degree of contamination. In particular the use of x-rays or ultrasonic waves enables an efficient detection of particles, certainly those having a specific size. Additionally, a combination of a filter and pressure measuring means incorporated in a milk line for defining the pressure ratio over the filter can be used as a sensor. However, the invention is not restricted to only the above-mentioned sensors, but extends to any possible type sensor which can be used to detect contamination in the milking system.

The apparatus described herein is adapted to constitute part of a fully automated milking and cleaning system, wherein use is made of a system for automatically admitting animals, selectively if required, to where the milking takes place, an animal identification system, a system for cleaning the teats, a robot (the robot 8) for automatically connecting teat cups and disconnecting same, an automatic milking process incorporating means for controlling the quality of the milk and the steps of the process, an automatic feeding system, etc., the entire system being controlled by a computer (the computer 9).

The invention is not restricted to the embodiment disclosed and shown herein, but may include modifications as will occur to one skilled in the art in view of the disclosure which are within the scope of the following claims.

Having disclosed my invention, what I claim as new and be secured by Letters Patent of the United States is:

1. An apparatus for milking animals, such as cows, comprising teat cups, a milking robot for automatically connecting said teat cups to the teats of an animal, a milking machine for automatically milking animals, a bulk milk tank for receiving milk from said milking machine, interconnecting milk conduits connecting said teat cups to said milking machine and the latter to said bulk milk tank, and a plurality of sensors for detecting contamination in said interconnecting milk conduits.

2. An apparatus in accordance with claim 1, comprising a computer for recording the contamination that has been ascertained by said sensors.

3. An apparatus in accordance with claim 2, comprising cleaning means for the apparatus wherein said computer has recorded a preprogrammed maximum degree of contamination to be tolerated and means for initiating the operation of said cleaning means, whereby when contamination equal to or above said preprogrammed maximum degree is sensed by said sensors, said computer initiates operation of said cleaning means.

4. An apparatus in accordance with claim 3, wherein said milking machine comprises a container for receiving milk from said teat cups, a further sensor for detecting the degree of contamination in said container, said further sensor connected to said computer.

5. An apparatus in a milking system for milking animals, such as cows, comprising teat cups, a milking robot for automatically connecting said teat cups to the teats of an animal, a milking machine that includes said teat cups for automatically milking the animals, a sensor for sensing contamination in the milking system, said cleaning means operatively associated with said sensor, said cleaning means effecting the cleaning of the milking system on the basis of the degree of contamination sensed by said sensor.

6. An apparatus in accordance with claim 5, wherein the degree of contamination of the milking system that causes said cleaning means to clean said milking system is that sensed by said sensor after an animal has been milked.

7. An apparatus in accordance with claim 6, which comprises timing means which is associated with said sensor, said timing means effecting the cleaning of the milking system after a predetermined period of time has elapsed from the last time that the milking system was cleaned by said cleaning means.

8. An apparatus in a milking system for milking animals, such as cows, comprising a set of teat cups, a milking robot for automatically connecting and disconnecting said teat cups to and from the teats of an animal, a container for receiving milk from said teat cups, a bulk milk tank connected to said container by a conduit, cleaning means for cleaning said teat cups, said container and said conduit, a plurality of sensors for sensing contamination of milk received from said teat cups, for sensing contamination of milk in said containers and for sensing contamination of milk in said conduit, timing means, said sensors actuating said cleaning means to clean said teat cups, said container and said conduit on the basis of a predetermined degree of contamination which has been sensed by at least one of said sensors, said timing means also actuating said cleaning means after a predetermined period of time has elapsed since the preceding milking of an animal by the milking apparatus.

9. An apparatus in accordance with claim 8, comprising a pump in said conduit and a connection downstream of said pump to a gaseous fluid for selectively introducing said gaseous fluid into and moving said gaseous fluid through said conduit.

10. An apparatus in accordance with claim 9, comprising a three-way valve in said conduit between said pump and the outlet of said conduit in said bulk milk tank, a recirculation line connected to said three-way valve, a cleansing fluid reservoir connected to said recirculation line, a first cleansing line connecting said reservoir to said teat cups for flushing said teat cups with a cleansing fluid, and a second cleansing line connecting said reservoir to said container for flushing said container with cleansing fluid, so that there is a first recirculation circuit from said three-way valve to said reservoir, from said reservoir to said teat cups, from said teat cups to said container, from said container to said conduit, and from said conduit to said three-way valve, and a second recirculation circuit from said three-way valve to said reservoir, from said reservoir to said container, from said container to said conduit, and from said conduit to said three-way valve.

11. An apparatus in accordance with claim 8, wherein at least one of said sensors comprises a radioscopic sensor.

12. An apparatus in accordance with claim 8, wherein at least one of said sensors comprises an ultrasonographic sensor.

13. An Apparatus in accordance with claim 8, wherein at least one of said sensors comprises a filter and pressure differential measuring means to measure the reduction in pressure of fluid passing through said filter.

14. A milking system for milking animals, such as cows, comprising a set of teat cups, a robot for placing said teat cups on the teats of an animal and removing them therefrom, a computer for controlling said robot, separate passageways depending from each said teat cup for carrying milk received in said teat cups, each said passageway containing a valve and downstream of said valve a sensor, a container which receives milk discharged from said teat cups via said valves and said sensors, a further sensor in said container, a bulk milk tank, a conduit for conveying milk from said container to said bulk milk tank, a sensor in said conduit for sensing contamination therein, said sensors operatively connected to said computer, means for introducing a cleansing fluid into said teat cups, from said teat cups through said passageways, from said passageways into said container, from said container into said conduit, and from said conduit to said bulk milk tank, said computer being connected to said means for introducing a cleansing fluid when at least one of said sensors detects a degree of contamination at least as high as a predetermined level of contamination.

15. An apparatus in accordance with claim 14, comprising timing means in said computer for actuating said means for introducing a cleansing fluid when no animal has been milked in the milking system after a predetermined duration of time.

16. An apparatus in accordance with claim 15, comprising a source of gaseous fluid and a connection from said source to said conduit with valve means in said connection for selectively introducing gaseous fluid into said conduit for flushing liquid fluid therefrom.

17. An Apparatus in accordance with claim 16, wherein said gaseous fluid is composed of air.

* * * * *